United States Patent [19]

Likuski et al.

[11] Patent Number: 4,971,820

[45] Date of Patent: Nov. 20, 1990

[54] ANIMAL FEEDS AND PROCESSES FOR THEIR MANUFACTURE

[75] Inventors: Henry J. A. Likuski, Weston; Varoujan Jebelian, Willowdale; Harvey G. Dorrell, Mississauga; Kenneth S. Darley, Ajax, all of Canada

[73] Assignee: Canada Packers Inc., Canada

[21] Appl. No.: 360,539

[22] Filed: Jun. 2, 1989

[51] Int. Cl.$^5$ ............................................. A23K 1/00
[52] U.S. Cl. ................................. 426/281; 426/302; 426/516; 426/518; 426/523; 426/454; 426/601; 426/646; 426/805
[58] Field of Search ............... 426/516, 518, 281, 302, 426/601, 454, 646, 805, 305, 307, 523

[56] References Cited

U.S. PATENT DOCUMENTS

| | | | |
|---|---|---|---|
| 2,945,764 | 7/1960 | Lanz | 426/302 |
| 3,928,634 | 12/1975 | Gasbarro | 426/281 |
| 3,993,796 | 11/1976 | Steinke | 426/454 |

FOREIGN PATENT DOCUMENTS

| | | | |
|---|---|---|---|
| 3306027 | 8/1984 | Fed. Rep. of Germany | 426/634 |
| 0041467 | 3/1985 | Japan | 426/281 |
| 835405 | 6/1981 | U.S.S.R. | |

*Primary Examiner*—R. B. Penland
*Attorney, Agent, or Firm*—Bacon & Thomas

[57] ABSTRACT

Animal feed pallets such as fish feeds, dog and cat foods in pellet form and textured soya protein pellets, are prepared by a process in which edible liquid is added to the pellets and absorbed under conditions of reduced pressure. In this way, larger amounts of edible liquids such as lipids can be incorporated into the pellets without significant deterioration in other desirable properties of the pellets such as hardness and durability.

12 Claims, No Drawings

ANIMAL FEEDS AND PROCESSES FOR THEIR MANUFACTURE

FIELD OF THE INVENTION

This invention relates to solid, particulate food products suitable for feeding to animals such as fish, poultry, dogs, cats, swine, etc., and to processes for the production thereof. More particularly, it relates to a process of producing feed pellets of improved physical characteristics and nutritional value.

BACKGROUND OF THE INVENTION

Feed materials that are commercially manufactured for domestic animals such as fish, dogs, cats, poultry and swine frequently contain the maximum amount of lipid that can be incorporated into the materials without altering their desired physical form. This is done for purposes such as lowering the cost of the materials, maximizing animal performance results, and minimizing the amount of excrement voided by the animals.

In the case of fish farming, compacted feed materials commonly consist of feed pellets of standard size and uniform composition, for ease of administration to and diet control of the fish. The lipid ingredients are typically of marine origin, such as fish oils. Standard fish feed pellets commonly contain 10–18% by weight of fish oil. Increases in this level, desirable to increase the nutritional value of the feed per unit weight, adversely affect the structural integrity of the pellets, in terms of hardness and surface oiliness. Then the pellets tend to lose their free-flowing nature during transportation.

The commonly adopted process for making fish feed pellets is one of mixing the ingredients and then pelletizing them. Pelletizing is essentially a process of compaction. The pellets are compressed to certain hardness, porosity and density over which there is little control or flexibility. Most of the oil content must be included in the mixture prior to pelletizing, but attempts to include larger amounts than about 10–18% lead to the formation of pellets of insufficient hardness and durability. Whilst small amounts of additional oil can be incorporated by adding oil subsequently to the pellets, this is a time-consuming step. The subsequently added oil only attaches to and becomes absorbed in the pellets slowly, and for the most part remains on the surface, as it cures, over about 48 hours. Before that process is completed, the pellets cannot acceptably be bagged and shipped.

Some pelletized fish feeds and other pelletized pet foods are conventionally made by an extrusion method. In the extruder, the ingredients may be mixed, cooked, sheared, gelatinized, and formed and chopped into pellets, rather than simply compacted and chopped into pellets in a pelletizing process. The extrusion process allows more control over density and porosity of the product, than in the case of pelletizing, although it is a more expensive process and requires more expensive equipment. For example, the control can be exercised by varying the degree of cooking, or by varying the extruder outlet conditions to provide for greater expansion of the product on issue from the extruder, so as to form a less dense product. Additional oil can be added to an extruded pelletized product, but again the amount is limited by surface effects.

Other pet food products which are handled in pellet form include textured vegetable proteins such as textured soya protein (TSP), which is basically a fully cooked defatted soya protein. This is used as a meat extender in canned dog foods and cat foods. TSP is prepared by cooking and extruding the material, then dehydrating it in pellet-like form for storage and transportation. It is re-hydrated prior to addition to the food cans. If its density after re-hydration is not correct, it will not mix adequately with the other ingredients.

Further, various pet foods for dogs and cats are produced in hard pellet forms, and contain varying quantities of lipids. Poultry feeds and swine feeds similarly are prepared and used in pellet form. In all these cases, it is often desirable that the pellets be of uniform, controlled composition, with high lipid content.

It is an object of the present invention to provide a novel process for preparing animal feed pellets.

It is a further object of the invention to provide such a process which can yield feed pellets of improved nutritional content and controlled density and texture.

SUMMARY OF THE INVENTION

The present invention provides a process whereby edible liquids are added to feed pellets and absorbed into the pellets under conditions of reduced atmospheric pressure. The feed pellets are first formed by a conventional compacting-pelletizing process, or by an extrusion process, and then treated with edible liquid under reduced pressure. The process has been found to give unexpected advantages in the pelletized products, both in connection with the nature and composition of the product, and in the ease and economy with which the process can be conducted and the flexibility of conditions which can be adopted to give a wide variety of feed products.

In connection with oil-containing fish feed pellets, for example, the process of the present invention permits larger amounts of lipid to be added, without destroying the integrity of the pellets, and by use of the simple compaction-pelletizing process. In connection with extruded pellets of animal feed, the process allows for control of the density of the pellets, independently of the composition and texture thereof, whilst allowing absorption of relatively large volumes of edible lipids into the pellets. With TSP, the adjustment of the water content of the pellets by the process of the invention again allows independent control over the density of the end product, for improved mixing with the other canned pet food ingredients.

Thus according to one of the aspects of the present invention, there is provided a process for preparing feed pellets of improved physical or nutritional characteristics, which comprises treating solid edible feed pellets with a controlled quantity of an edible liquid and subjecting the treated pellets to conditions of sub-atmospheric pressure to absorb edible liquid into the pellets, and recovering the pellets containing absorbed liquid in solid, discrete form.

According to another aspect, the present invention provides discrete, free flowing feed pellets for feeding to animals, the feed pellets containing edible lipids in an amount of from about 20–50 cent of the total weight thereof, and having a and surface structure which allows their packaging bulk without substantial coalescence or collapse.

DESCRIPTION OF THE PREFERRED EMBODIMENTS

One preferred application of the process of the present invention is in the manufacture of fish feed pellets, e.g. salmon feed, for fish farming operations. Some of the lipid in the form of fish oil, typically 8-15% by weight of the total product, is incorporated in the mix prior to pelletizing. The conventional compacting-pelletizing process produces dense pellets, which will not absorb lipid subsequently applied into the interior of the pellets, to any significant extent. The only additional lipid which can be applied is surface lipid, which must be left to cure on the pellet surface. This curing process takes about 48 hours. By use of the process of the present invention, additional lipid can be incorporated, which will penetrate into the body of the pellets and not remain substantially at the surface, so that the content of total lipid can be substantially increased. When the pellets have been produced by a compacting-pelletizing process, their total lipid content can be increased to 20-35% of the total weight of the products, by use of the process of the invention. When the pellets have been produced by an extrusion process, their total lipid content can be increased even more by the process of the invention, e.g. up to 50% of the total weight or even higher.

The physical structure and integrity of the pellets is not harmed. The resulting, high-oil content pellets are of satisfactory hardness and surface structure to allow their packaging and transportation in bulk, a short time after preparation. The process of subjecting the pellets to vacuum conditions on or after application of the additional oil minimizes the formation of oily surfaces and loss of hardness, at least to a sufficient extent to maintain the integrity of the pellets satisfactorily for practical purposes.

If desired, the fish feed pellets may be mixed with a conventional drying agent, such as fine particle size silica, before or after the vacuum drying, and before or after the pelletizing process.

In the preferred procedure according to this aspect of the invention, both the pellets and the supplementary fish oil are heated prior to being mixed together. This accelerates the uptake of oil by the pellets, without noticeably affecting the pellet structure. The pellets should be heated preferably to at least 15° C. and most preferably to close to but not exceeding 70° C. prior to addition of supplementary fish oil to the pellets. The supplementary fish oil is suitably at a similar temperature at the time of mixing, but not, of course, at temperatures above its boiling point or decomposition temperature. Then the pellets are subjected, after soaking in supplementary fish oil, to reduced pressure conditions, i.e. vacuum pressure. This vacuum process suitably takes place at temperatures of from about 15-70° C. in a vacuum oven, under a vacuum pressure of from about 0-20 kPa, for about 1-30 minutes. Commercial apparatus is readily available which is suitable for this step, and in which the vacuum pressure is adjustable. A specific example is the apparatus sold under the trade mark VARIO-VAC, manufactured by Dorit Maschinen Handels ag.

Instead of the 48 hours' treatment time required for contact of the supplementary fish oil with the pellets according to conventional processes, whilst the oil cures and hardens, the process of the present invention permits the supplementary oil to be incorporated into the pellets in a time period of less than ten minutes, typically 2-4 minutes. In practice, the feed pellets are arranged to issue from the pelletizing machine at an appropriate temperature, usually allowed to harden for a few minutes and then fed directly into the vacuum oven preadjusted to the correct temperature. The preheated edible oil is added to the pellets in the vacuum oven, and then the vacuum oven is closed and the appropriate vacuum is drawn. After opening and emptying the oven of the pellets, they are ready for bagging and transportation. No substantial modification is necessary to the remainder of the pelletizing apparatus and packaging, and the process is conducted extremely rapidly and efficiently according to the invention.

The process of the present invention also adds considerable flexibility to the pelletizing process and the formulations which can be made. In animal feed other than fish feed, e.g. cat food, dog food, swine feed, poultry feed etc., lard is the commonly chosen lipid for inclusion in the pellets. For use in the present invention, the lard added for incorporation into the pellets after the pellets have been formed is appropriately in the liquid phase. By use of the present invention, less lipid needs to be incorporated in the feed mixture prior to pelletizing, since more lipid can be added after pelletizing. Accordingly, a formulation can be chosen prior to pelletizing which leads to improved durability and firmness of the final pellets. The amount of fines generated on pelletizing can be minimized, by adding less lipids to the base mixture prior to pelletizing. Pellets of better texture are thereby produced, and their high lipid loading can be restored or improved compared with conventional pellets, by the subsequent lipid treatment and absorption under reduced pressure according to the invention. The smaller the quantity of the lipid in the mix to be pelletized, the harder and more durable the pellets which can be made. The post-addition of the lipid according to the present invention does not significantly impair the durability of the pellets. Accordingly, the amount of lipid added before pelletizing as compared with the amount of lipid added after pelletizing and with absorption under reduced pressure according to the invention can be adjusted relative to each other, to obtain the desired combination of durability, texture and lipid quantity in the final pellets.

When the process of the present invention is applied to extruded pelletized products, similar advantages are obtained. In particular, since the lipid can be added in whole or in part to the extruded pellets after their formation and extrusion, a greater degree of flexibility on the conditions and ingredients in the extruder can be exerted, to prepare improved products. In particular, it allows control over the porosity and density of the pellets which can be produced. In the prior art processes, where it was desirable to include a substantial part of the lipid in the mixture prior to extruding and pelletizing, the range of porosity and density of products which could be produced was limited by the presence of this lipid. With the process of the present invention, where substantial quantities of the lipid are added after extrusion, more changes and variations in the conditions in the extruder can be effected without concern for the effects they may have on the lipid within the product at that time. It is generally preferred to precondition the mixture by steam treatment prior to extruding. This has a beneficial effect on the durability of the final pellets. Exposure to steam for a period of 30 seconds-1 minute is typically suitable. This raises the temperature of the mix prior to extruding, so as to provide further flexibility in extruder operation. Water treatment can be used instead of steam treatment, to produce denser pellets.

For example, the density of the extruded pellets can be adjusted by arranging for the material to expand as it issues from the extrusion die. In this way, a light product can be made, sufficiently light to float on water, which is a desirable characteristic of some fish feeds. The degree of expansion on issuing from the extruder die, and hence the density of the product, can be adjusted by adjusting the amount of cooking which takes place in the extruder, or by adjusting the quantity of expansible materials in the mix, for example starch. In other circumstances, fish feed pellets which will sink slowly or rapidly through a body of water may be desirable. The conditions and ingredients in the extruder can again be adjusted to prepare such feed pellets. Since, in the process of the invention, a certain fixed amount of lipid does not have to be added to the extruder, an extra degree of freedom is available to vary and adjust other characteristics of the final feed pellets. Moreover, as shown in the following specific examples, the addition of oil to the pellets and vacuum absorption thereof, according to the present invention, itself increases the sink rate of the pellets in water, independently of the formulation or conditions in the extruder.

Moreover, the production of a pelleted product by use of an extruder enables large amounts of lipid to be added subsequently, by the process of the invention, i.e. by absorption under reduced pressure. In addition, the density of the pellets themselves can be adjusted, by the amount of vacuum pressure which is drawn on the pellets after extrusion and by the amount of oil which is absorbed under reduced pressure by the pellets. This ability to adjust density and lipid content after extrusion allows for greater flexibility in the operating conditions of the extruder, use of cheaper ingredients and selection of most efficient or most economical extruding conditions, without paying serious regard to the consequential effects on pellet density.

The process of the invention appears to have the effect of withdrawing air from the pores of the pellets, thereby allowing greater penetration of lipids such as oils into the pores of the pellets. Accordingly, a more even uptake of lipid is achieved, without affecting the surface of the pellets. It allows greater quantities of lipid to be admitted to the pellets, even in comparison with the amounts which can be added by combination of pre-addition and post-addition to the pellets by prior art processes. The removal of substantial quantities of air from the pores of the pellets increases the shelf life of the final product and decreases the tendency towards rancidity.

Another area of preferred application of the present invention is in the preparation of textured vegetable protein. This material is usually defatted soya meal, and in its preparation for incorporation into pet foods it is fully cooked and extruded into pellet-like form, and then dehydrated. At extrusion, it typically has a water content of 30% by weight, and it is dehydrated typically to an 8% water content. Then it is in a form convenient for shipping from the textured vegetable protein-producing facility to the pet food preparation and canning facility.

Prior to or during its addition to pet food meat preparations, it is hydrated. The dehydrated material is a very porous material, and will re-absorb 2-3 times its own weight of water. As it does so, its density changes. Accordingly, if the material is insufficiently re-hydrated prior to addition to the pet food mixture, it will float on the material and be insufficiently homogeneously mixed into the food mix. If too much water is added to hydrate the textured vegetable protein, its density may be so high that it may interfere with the can filling operation.

The present invention provides a process whereby dehydrated textured vegetable protein may be evenly and carefully rehydrated, by addition of water thereto and drawing of a vacuum on the mixture. In this way, the density of the re-hydrated textured vegetable protein can be carefully controlled to the right level prior to its addition to the remainder of the food mixture. In this way it can be properly and evenly mixed in the food product, and will not interfere with the filling process.

The invention is further described for illustrative purposes only in the following specific examples.

EXAMPLE 1

Salmon feed pellets with fat contents of 14% and 17% were obtained by pelleting (laboratory pellet mill with a 4 millimeter die) feed mixtures consisting mainly of herring meal and herring oil and further containing about 10% moisture, about 12% inorganics, about 14% carbohydrates, balance protein. The pellets were stored at a room temperature of 21° C. and tested for hardness, as measured in kilograms with a Stokes hardness tester on four consecutive days and on the tenth day after pelleting. As a major part of this study, a portion of both the 14% fat and the 17% fat pellets were coated with herring oil (for 20 minutes in the vacuum oven at 54° C. with the Marsh vacuum gauge at 30 inches, equivalent to about 0 kPa) to obtain pellets with a final fat content of approximately 25% in each case. This was done with separate batches of pellets on the first, second, third, fourth and tenth day after pelleting. The fat-coated pellets were tested for hardness as given above.

In the case of the pellets that were not coated with herring oil, pellet hardness increased from the first day until the third day after pelleting and then remained constant. With the 14% fat pellets, the hardness increased from Stokes readings of approximately 5.5 to 6.5 With the 17% fat pellets, the hardness increased from 5.0 to only 5.5.

In the case of the 25% fat pellets coated with herring oil and vacuum dried, pellet hardness similarly increased from the first day until the fourth day after pelleting, and then remained constant. With the 14%-fat pellets to which approximately 11% herring oil was applied to the surface, the hardness increased from 5.0 to 6.0. With the 17%—fat pellets coated with approximately 8% herring oil, the hardness increased from approximately 4.5 to 5.5.

This shows that pellet hardness is increased by manufacturing the pellets from a feed mixture with a low amount of oil. This hardness is substantially retained after further oil is applied to the pellets' surface via the use of vacuum pressure.

EXAMPLE 2

Salmon-feed pellets, of approximately the same composition as reported in Example 1, were heated to temperatures of approximately 21° C. and 60° C. and placed in open-top plastic containers. Herring oil at 21° C. and 60° C. was mixed into the pellets at a level of 10%. This initially increased the lipid content of the 32 samples of pellets from 18% to 28%). The oil-coated pellets were placed in a vacuum-oven for time intervals of 10 minutes and 20 minutes (times which on subsequent experience are unnecessarily long). The vacuum-oven temperature was 60° C; the vacuum-gauge setting was 30 inches, equivalent to about 0 kPa. After vacuum-drying for either 10 minutes or 20 minutes, all of the samples of oil-coated pellets appeared to be dry and ready for bagging. Thus, they were immediately placed in small plastic bags, the bags were heat-sealed, and the samples were stored for 18 hours at 21° C. The bags were then opened, the oil-coated pellets were examined, and the amount of herring oil retained on the pellets was estimated from their gain in weight.

Pellet quality was very good. The amount of herring oil retained by the pellets was 6.6%, regardless of the experimental procedure that was used, thus increasing the total lipid content of the pellets to 24.8%, a value not achievable in good quality pellets without the use of vacuum pressure.

EXAMPLE 3

A standard 17.5%-fat (by acid hydrolysis) salmon feed of composition essentially as described in Example 1 was mixed and pelleted on pilot-plant scale (commercial pellet mill with a 7 millimeter die). One hour and 4 days after pelleting, the salmon-feed pellets were coated with 7.0% herring oil. This was accomplished by placing the pellets at 18° C. and the herring oil at 82° C. in a Vario-Vac,. The ingredients were mixed together for approximately 5 minutes while the vacuum was gradually increased over a period of 4 minutes to 9 kPa. Mixing was continued for a further 5 minutes under this vacuum. The mixing and vacuum pressure were then discontinued, and a sample of the fat-coated pellets was obtained to determine the "oiliness" and hardness of the pellets. Fine particle size silica at a level of 0.8% was mixed into the remaining pellets for 2 minutes, and a further sample of fat-plus-silica coated pellets was obtained to determine the "oiliness" and hardness of the pellets.

As indicated above, the pellets were coated with herring oil without and with silica one hour and 4 days after they were manufactured. Visual inspection was used to assess the "oiliness" of the pellets immediately after they were coated with these materials. The Stokes hardness tester was used to determine the hardness of the pellets within 2 hours after they were coated with herring oil, and for 5 consecutive days thereafter in the case of the pellets coated with herring oil one hour after they were manufactured. Only two such measurements were taken for pellets coated with herring oil 4 days after manufacture. The hardness of pellets without surface fat was determined.

After vacuum-drying, the surface of the herring oil-coated pellets was judged to be a bit oily but not too "oily" for the pellets to be bagged. The addition of fine particle size silica to the pellets immediately removed all traces of "oiliness" from the pellets. The base pellets without surface fat had an average Stokes hardness reading of 6.0 on the day of pelleting. This value gradually increased to 7.1 on days 4 and 5 after pelleting. The pellets coated with herring oil one hour after pelleting had an average Stokes hardness reading of 5.6 on the day of pelleting. This value also gradually increased to 6.2 on days 4 and 5 after pelleting. The pellets coated with herring oil 4 days after pelleting had an average Stokes hardness reading of 6.5 on days 4 and 5 after pelleting. The addition of fine particle size silica did not noticeably affect the hardness of the pellets.

EXAMPLE 4

Fish feed pellets, in 7 millimeter sizes and 11 millimeter sizes, were manufactured with a single screw extruder and tested for various physical characteristics of importance in commercial fish feeds, e.g. buoyancy.

The 7-millimeter pellets were manufactured from a fish feed base mixture that mainly contained herring and capelin fish meals. The feed mixture contained 15% fat. It was ground in a Fitz mill to a maximum particle size of 1.5 millimeters prior to being extruded.

The 11-millimeter pellets were manufactured from a fish feed base mixture that mainly contained menhaden fish meal. The feed mixture contained 12% fat. It was ground in a hammer mill to a maximum particle size of 1.5 millimeters prior to being extruded.

For the manufacture of the 11-millimeter pellets, one feed mixture was conditioned with steam prior to being extruded. Herring oil was added to the feed mixture at a level of 3% during the conditioning process. The second feed mixture was conditioned with water instead of steam. This was done to increase the density of the pellets.

Two separate 100-gram samples of each of the three extruded fish feeds so prepared were coated with herring oil at a level of 20% (25 grams of herring oil per 100 grams of salmon feed). One of the samples from each of the groups was placed in vacuum desiccator and subjected to a vacuum pressure of 13 kPa for a time of 6 minutes.

The fat-coated pellets were visually assessed for surface "oiliness". Then the rate at which they sank through 1.5 metres of water with 4% salt was determined. For this purpose, 5 pellets were chosen at random from each of the treatments. The rate of sink values were compared with those determined for ten of the same extruded pellets without surface fat.

The results are presented in Table 1.

TABLE 1

| The "Rate of Sink" of Extruded Pellets without and with Surface Fat | | | |
|---|---|---|---|
| | Pellet Size and Conditioning Method | | |
| | 7-mm | 11-mm | |
| | Steam | Steam | Water |
| Base Pellets Without Surface Fat | | | |
| Fat Content (%) | 15 | 15 | 12 |
| % that Sank in Salt Water | 60 | 0 | 40 |
| Time to Sink 1.5 m (Sec) | 29 ± 7* | — | 25 ± 9 |
| Pellets Coated with Fat | | | |
| Estimated Fat Content (%) | 35 | 35 | 32 |
| % that Sank in Salt Water | 100 | 100 | 100 |
| Time to Sink 1.5 m (Sec) | 26 ± 10 | 27 ± 11 | 17 ± 6 |
| Surface Appearance | Oily | Oily-some free oil | Dry |
| Pellets Coated with Fat Under a Vacuum | | | |
| Estimated Fat Content (%) | 35 | 35 | 32 |
| % that Sank in Salt Water | 100 | 100 | 100 |
| Time to Sink 1.5 m (Sec) | 17 ± 1 | 11 ± 1 | 16 ± 7 |
| Surface Appearance | Dry | Oily | Dry |

*Means with Standard Deviations

None of the fat-coated pellets floated on the surface of the water as occurred with the extruded pellets without surface fat. Extruded 7 mm and 11 mm pellets that were manufactured by conditioning the feed mixture with steam sank through 1.5 m of 4% salt water in approximately 26 seconds when their surface was coated with 20% herring oil. They sank through 1.5 m of 4% salt water in approximately 14 seconds when their surface was coated with herring oil by the use of a vacuum. The latter value is a desirable rate-of-sink for extruded salmon feeds.

These results indicate that the rate of sink of high fat content (35%) salmon feed pellets can be increased by more than 50% by applying the vacuum pressure technique to oil-treated pellets according to the invention. The process can also provide high fat content pellets of improved durability. Accordingly, the operator has the freedom to adjust the extruder operating conditions and formulation with a view to providing pellets of the required hardness and durability, without at the same time being concerned with consequential effects on the density and buoyancy of the products. That adjustment, along with the raising of the fat content to previously unattainable levels, can if desired be achieved by the post-treatment oil absorption under vacuum. This provides the operator with additional opportunities to custom manufacture products to a customer's specification.

EXAMPLE 5

The effect of varying the amount of vacuum pressure and vacuum time on the amount of herring oil retained on the surface of 15% fat extruded fish feeds that are further coated with approximately 15% herring oil, and on other physical characteristics of the pellets was studied.

Extruded 15% fat fish feed pellets, 11 mm in size, were coated with 15% herring oil by mixing the pellets and herring oil together without and with vacuum pressures of 70 kPa, 35 kPa and 7 kPa for times of 2 minutes and 4 minutes. The effect of the above processes on the amount of fat retained in the pellets, and various physical characteristics of the pellets, was then determined.

These extruded pellets were the same as those used in Example 4. They were manufactured from essentially the same feed mixtures that were used to manufacture the previously reported samples. Eight 25 g samples of the extruded pellets were separately placed in a glass flask of a laboratory-sized rotary evaporator. The temperature of the pellets and flask were near 22° C.

Herring oil at 22° C. was separately added to each sample of pellets at a level of 15%. The pellets and herring oil were mixed together without and with vacuums of 70 kPa, 35 kPa and 7 kPa for times of 2 minutes and 4 minutes. The mixing was done without agitating the pellets, by slowly rotating the glass flask on the rotary evaporator. The pellets and herring oil were mixed together for times of 2 minutes and 4 minutes, after the desired vacuum pressures were attained.

When the mixing was complete, the vacuum was released and the fat coated pellets were placed on Whatman No. 54 filter paper. They were gently rotated on the filter paper, at 15-minute intervals, for approximately 1 hour. The amount of fat retained on the fat-coated pellets was then determined by both weighing the pellets and weighing the amount of fat absorbed on the filter paper.

The fat-coated pellets were visually assessed for surface oiliness. Then the rate at which they sank through 1.5 m and 1.0 m of water with 4% salt was determined. Five pellets were selected at random for each of the 1.5 m and 1.0 m determinations. The latter determination was made after the pellets had sunk through 0.5 m of water. The "dwell time" of the pellets was subsequently calculated as the time, in seconds, it took the pellets to sink 1.5 m minus 1.5 times the time, in seconds, it took the pellets to sink the latter 1.0 m. This value indicates whether or not the pellets tend to be more buoyant when first placed in water than after they are in the water for a short period of time.

In addition to "dwell time", in this example a "true hardness" value was determined for the pellets. "True hardness" is a typical pellet hardness reading obtained with a Stokes hardness tester minus an initial reading obtained when the jaws of the Stokes hardness tester first contact the pellet without noticeably applying pressure to the pellet.

The results are presented in Table 2.

TABLE 2

THE PHYSICAL PROPERTIES OF EXTRUDED 11-MM PELLETS WITH 15% FAT THAT WERE STEAM CONDITIONED PRIOR TO MANUFACTURE AND THEN FURTHER COATED WITH 15% HERRING OIL

| Procedure Used to Coat Surface Fat | | | | | | | | |
|---|---|---|---|---|---|---|---|---|
| Vacuum (kPa) | 100 | 100 | 70 | 70 | 35 | 35 | 7 | 7 |
| Mixing Time (minutes) | 2 | 4 | 2 | 4 | 2 | 4 | 2 | 4 |
| Pellet Parameter Determined | | | | | | | | |
| Surface Oil Retained (%) | 97 | 97 | 98 | 99 | 98 | 99 | 98 | 99 |
| Hardness* | 5.9 ± 0.6 | 6.2 ± 0.2 | 5.8 ± 0.3 | 6.0 ± 0.6 | 6.0 ± 0.2 | 6.2 ± 0.3 | 5.8 ± 0.4 | 5.8 ± 0.4 |
| "True Hardness" | 2.9 | 3.2 | 2.8 | 3.0 | 3.0 | 3.3 | 2.8 | 2.8 |
| Bulk Density (G per Litre) | — | — | — | — | — | — | — | 615 |
| % that Sank in Salt Water | 80 | 20 | 80 | 100 | 100 | 100 | 100 | 100 |
| Time to Sink 1.5 meters (sec.) | 29 ± 6 | 35 | 30 ± 2 | 19 ± 39 | 25 ± 8 | 21 ± 2 | 17 ± 4 | 18 ± 3 |
| Time to Sink 1.0 Meter (sec.) | 14 ± 3 | 16 | 12 ± 1 | 10 ± 1 | 16 ± 4 | 13 ± 2 | 11 ± 2 | 14 ± 3 |
| "Dwell Time" in Water (sec.) | 8 | 10 | 12 | 3 | 0 | 1 | 2 | 0 |
| Surface Appearance | | | | Slightly Oily | | | | |

*Hardness of base pellet was 6.0 ± 0.6

The results show that 30% oil content pellets can be prepared without significantly decreasing the hardness of the pellets. Their buoyancy can be adjusted by changing the vacuum coating conditions.

EXAMPLE 6

The amount of fat retained on extruded dog and cat food pellets that were coated with 15% and 30% melted lard was determined, by mixing the pellets and lard together without and with vacuum pressures of 70 kPa and 35 kPa for times of 2 minutes and 4 minutes.

The basic pellets used were a dog food with 15% fat, a puppy food with 8% fat and a cat food with 6% fat. The dietary fat levels were chemically determined by an acid-hydrolysis procedure. The pet foods had calculated protein contents near 30%. Their main feed ingredients were corn, wheat shorts, soybean meal, meat meal, poultry meal and fish meal.

Twelve 25-gram samples of each pet food were separately placed in a glass flask of a laboratory-size rotary evaporator. The temperature of the pellets and flask were at room temperature.

Lard that had been melted at a temperature of 49° C. was separately added to each sample of pet food at levels of 15% (4.4 grams of lard per 25 grams of pet food) and 30% (10.7 grams per 25 grams). The lard, which was produced by extracting it from pig skins, was "feed grade" in quality. It had a melting point of 28° C, as determined on a Mettler PF 80 Drop-Point apparatus.

The pellets and lard were mixed together without and with vacuums of 70 kPa and 35 kPa for times of 2 minutes and 4 minutes. The mixing was done without agitating the pellets, by slowly rotating the glass flask on the rotary evaporator. The pellets and lard were mixed together for times of 2 minutes and 4 minutes after the desired vacuum pressures were attained.

When the mixing was complete, the vacuum was released and the fat-coated pellets were placed on Whatman No. 54 filter paper. They were gently rotated on the filter paper, at 15 minute intervals, for approximately 1 hour. The amount of fat retained on the pellets was then determined by both weighing the fatcoated pellets, and weighing the amount of fat absorbed on the filter paper.

It was found that larger amounts of lard could be incorporated in the pellets by surface application and vacuum pressure, with retention of acceptable surface appearance, than in cases where vacuum pressure was not used.

EXAMPLE 7

Extruded, defatted soybean meal pellets (TSP) were hydrated without and with the simultaneous use of a vacuum, to determine the effect on the amounts of water retained by and the specific densities of the hydrated pellets.

Twenty 20-gram samples of TSP pellets were placed in glass containers that were subsequently equally divided into four separate groups. Ten grams, 20 grams, 30 grams, 40 grams or 60 grams of water were then added to the pellets in the containers in each group. The pellets and water were mixed together for times of 4 minutes and 30 minutes without and with the use of 7 kPa of vacuum. The vacuum was applied via the use of a rotary evaporator for 4 minutes. In the case of pellets hydrated for 30 minutes, the vacuum was applied during the final 4 minutes of the hydration process.

Excess water was drained, via the use of sieve, from the hydrated TSP pellets. The pellets were then weighed, and the percentages of added water that they retained were calculated. After being weighed, the pellets were stored in sealed plastic containers in a refrigerator at 4.4° C. for 16 hours. Then the pellets' specific densities were determined. They were determined as the weights of the pellets relative to the weights of the volumes of water at room temperature (22° C) that were displaced by the pellets.

The results of this study are summarized in Table 3.

TABLE 3

The Effects of Hydration Time and Vacuum Pressure on the Amount of Water Retained by and the Average Specific Density of TSP Pellets

| Time in Minutes of | | % Water[1] | Specific |
|---|---|---|---|
| Hydration | Vacuum | Retained | Density[2] |
| 4 | 0 | 68.1 | 0.94 |
| 30 | 0 | 80.1 | 0.97 |
| 4 | 4 | 83.3 | 0.98 |
| 30 | 4 | 88.4 | 1.03 |

[1]Mean of the percentages of added water retained by TSP pellets over a pellet:water range of 1.0:0.5–1.0:3.0.
[2]Mean of the specific densities of TSP pellets over a pellet:water range of 1.0:0.5–1.0:3.0.

It was determined that the percentage of added water retained in TSP pellets decreases when greater amounts of water are added to the pellets over a pellet:water range of 1.0:0.5–1.0:3.0. More importantly, however, it was determined that both the percentages of added water retained in TSP pellets and TSP pellet specific densities are increased by the simultaneous use of vacuum pressure during the hydration process. More water can be added in shorter time, and the process can be tailored to obtain pellets of desired hydration level and density, by varying the vacuum.

We claim:

1. A process for preparing animal feed pellets of improved physical or nutritional characteristics, which comprises surface treating solid edible feed pellets with a controlled quantity of an edible liquid and subjecting the treated pellets to conditions of subatmospheric pressure to absorb edible liquid into the pellets, and recovering the pellets containing absorbed liquid in solid, discrete form.

2. The process of claim 1 wherein the pellets initially are produced by a process of extrusion followed by chopping into pellets after emergence from an extruder die, and subsequently treated under subatmospheric pressure conditions with edible liquid for absorption thereinto.

3. The process of claim 2 wherein the pellets comprise fish feed containing nutritive fish oil, and the edible liquid with which the pellets are treated at subatmospheric pressure is also nutritive fish oil.

4. The process of claim 2 wherein the pellets comprise animal pet food which has been cooked in the extruder.

5. The process of claim 1 wherein the pellets are of textured vegetable protein, and the edible liquid is water.

6. A process for preparing animal feed pellets having a solid edible proteineous base and a high edible lipid content, which comprises surface treating preformed solid animal feed pellets containing from about 10–18% by weight of liquid lipid with a controlled quantity of an edible liquid lipid and subjecting the so treated pellets to conditions of subatmospheric pressure to absorb the liquid lipid into the pellets, and recovering the pellets in solid, discrete form and having a total content of liquid lipid of from about 20–50% by weight.

7. The process of claim 6 wherein the pellets are initially produced by a compactionpelletization step and fed from the pelletizing step to the subatmospheric pressure, liquid absorption step.

8. The process of claim 6 wherein the pellets comprise fishfeed containing nutritive fish oil, and the edible liquid with which the pellets are treated at subatmospheric pressure is also nutritive fish oil.

9. Discrete, free flowing pellets for feeding to animals, comprising feed pellets containing edible lipids, said edible lipids present in the pellets in an amount of from about 20–50% of the total weight thereof, said pellets retaining a hardness and surface structure which allows their packaging in bulk without substantial coalescence or collapse.

10. Pellets according to claim 7 having a Stokes hardness of from 4.5 to 7.1.

11. Pellets according to claim 10 prepared by a compaction-pelletization process and having lipid content of from 20–35 per cent of the total weight of the products.

12. Pellets according to claim 10 prepared by an extrusion process and having a total lipid content of from 30–50 per cent of the total weight of the products.

* * * * *